United States Patent [19]

Connery

[11] Patent Number: 4,980,098

[45] Date of Patent: Dec. 25, 1990

[54] GAS/LIQUID HEAT AND/OR MASS EXCHANGER

[75] Inventor: Colin A. Connery, Mt. Vernon, N.Y.

[73] Assignee: Living Water Corporation, Chicago, Ill.

[21] Appl. No.: 317,459

[22] Filed: Mar. 1, 1989

[51] Int. Cl.$^5$ ............................................. B01F 3/04
[52] U.S. Cl. ................................ 261/112.1; 165/115; 159/13.4; 55/240
[58] Field of Search .................... 261/112.1; 165/115; 159/13.4, 13.1; 55/240

[56] References Cited

U.S. PATENT DOCUMENTS

| | | | |
|---|---|---|---|
| 671,375 | 4/1901 | Gallaher | 261/112.1 |
| 965,116 | 7/1910 | Morison | 159/13.1 |
| 2,054,809 | 9/1936 | Fleisher | 261/112.1 |
| 2,133,819 | 10/1938 | Howse et al. | 261/112.1 |
| 2,514,943 | 7/1950 | Ferris et al. | 159/13.3 |
| 2,514,944 | 7/1950 | Ferris et al. | 159/13.3 |
| 3,044,993 | 7/1962 | Tiemersma | 159/13.4 |
| 3,496,996 | 2/1970 | Osdor | 165/115 |
| 3,748,828 | 7/1973 | Letebvre | 55/240 |
| 3,782,703 | 1/1974 | Kolar | 261/112.1 |
| 3,795,388 | 3/1974 | Toth | 261/112.1 |

FOREIGN PATENT DOCUMENTS

| | | | |
|---|---|---|---|
| 913782 | 6/1954 | Fed. Rep. of Germany | 165/115 |
| 61-168789 | 7/1986 | Japan | 165/118 |

*Primary Examiner*—Tim Miles
*Attorney, Agent, or Firm*—Clement and Ryan

[57] ABSTRACT

A gas/liquid heat and/or mass exchanger including a chamber to hold the liquid, the bottom wall of the chamber defining at least one outlet orifice. A plurality of thin guide filaments descends from the orifice or orifices, and at least one thin, falling film of liquid flows down the filaments. The guide filaments are preferably substantially straight and under longitudinal tension. They may be either vertically oriented or tilted, and each one may be either a monofilament of multiple filament. An array of guide filaments may descend from each outlet orifice, and all such arrays may be parallel. A preferred form of the method of forming each outlet orifice is disclosed. A non-fouling nozzle for controlling the flow of liquid is disclosed as a subcombination.

12 Claims, 5 Drawing Sheets

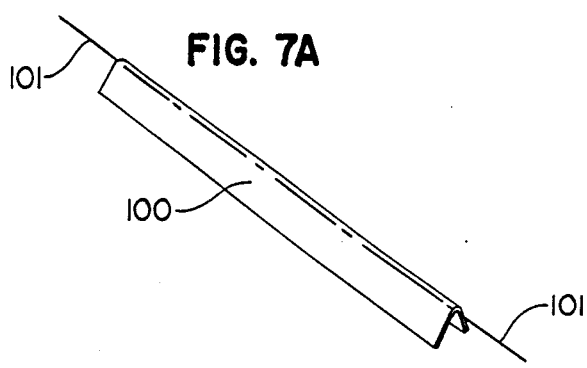
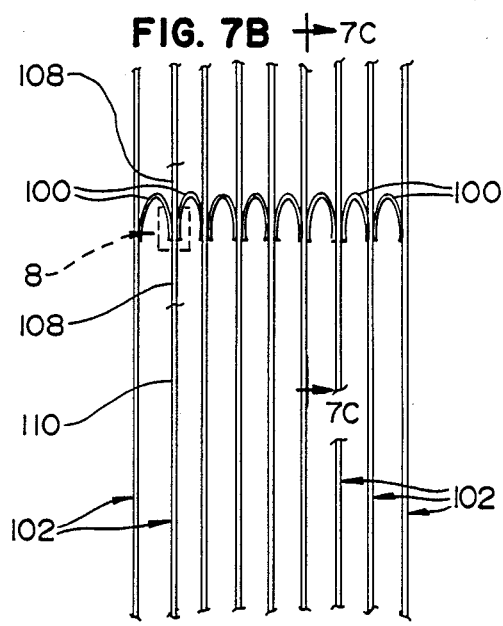
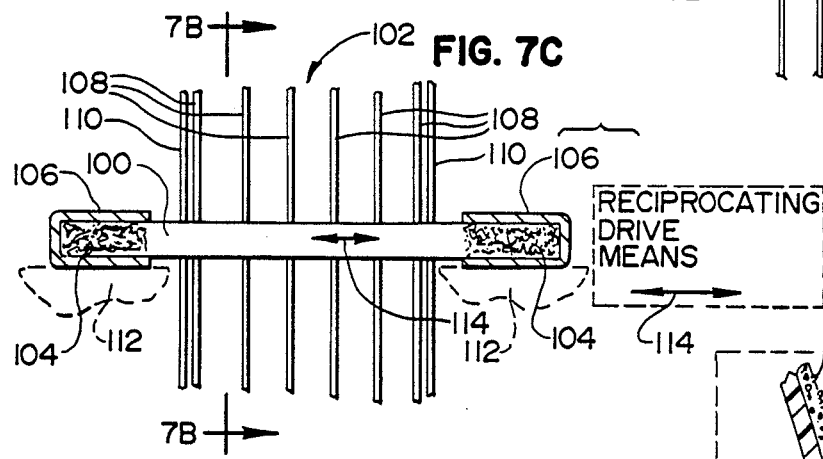
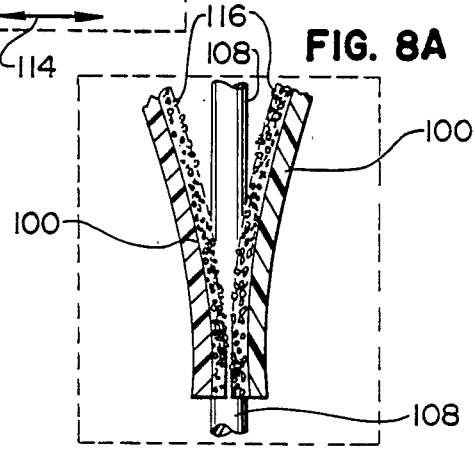
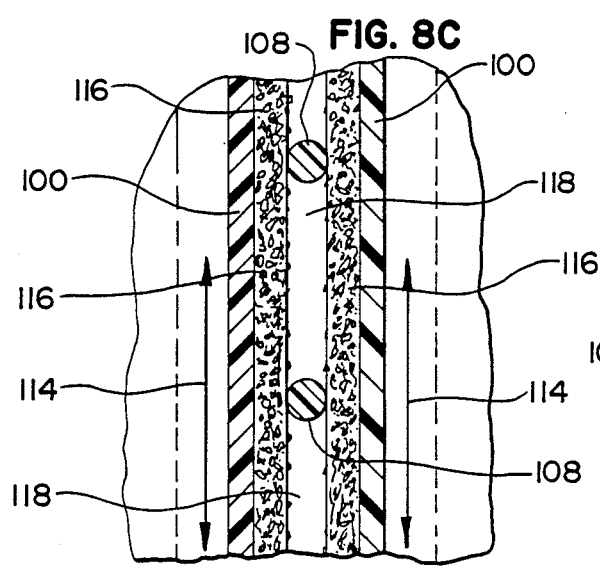
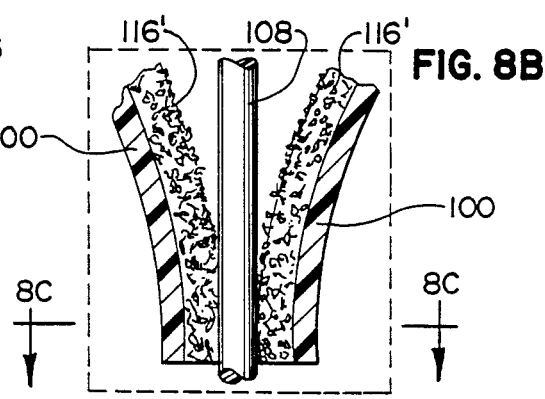

GAS/LIQUID HEAT AND/OR MASS EXCHANGER

FIELD OF THE INVENTION

This invention relates to a gas/liquid heat and/or mass exchanger, i.e., apparatus in which a gas is brought into direct contact with a liquid for the purpose of exchanging heat and/or mass between the gas and the liquid.

BACKGROUND OF THE INVENTION

This invention is derived from the familiar spray tower or spray chamber type of heat or mass exchanger. In these exchangers, an overhead array of nozzles injects a falling cloud or spray of liquid droplets into either a rising column or a cross-flow of gas.

The most common gas and liquid combination with which such an exchanger is used is air and water. Heat or water vapor is exchanged, or the water is aerated or degassed.

There are several problems that limit the performance of such an exchanger. One problem, which relates to the droplet nozzles, results from a natural hysteresis that requires a greater pressure to initiate a flow of liquid through a nozzle than is needed to sustain the flow once it has started This hysteresis is a result of the siphoning effect of the stream of liquid flowing from an active nozzle. Because of this hysteresis effect, it is difficult, when operating with a low pressure head, to activate all the nozzles of the exchanger, even if they are closely matched as to physical characteristics.

One method for distributing the flow evenly among all the nozzles is to constrict the nozzles so that they exhibit a significant dynamic back pressure. Though effective, this strategy imposes an energy penalty because of the greater pressure required for operation of the apparatus. Also, the narrow nozzle passages are especially vulnerable to clogging from scale and particulate matter build-up.

A second problem that limits the performance of a conventional spray tower is the fact that liquid droplets inevitably follow irregular paths as they fall. As a result, some droplets bump into laterally adjacent droplets and merge with them, while other droplets fall more quickly than, and plow into and merge with, more slowly moving droplets.

Another problem arises from the fact that for the most effective operation of a spray tower it is best for certain characteristics (such as temperature, or concentration of a give dissolved or suspended material) of the gas and liquid spray that make up the mixture in the spray tower to proceed progressively from top to bottom of the tower. This progression in various characteristics of the rising gas and the falling liquid spray tends to be destroyed by too thorough mixing of the gas and spray. Unless the ratio of the diameter of the tower to its length is very small (as with a tall, narrow spray tower) the gas will be quite thoroughly mixed with the spray, the relevant characteristics of the gas and liquid, respectively, will then be averaged out rather than varying progressively from the top to the bottom of the spray tower, and as a result full advantage of countercurrent flow can not be taken. However, the diameter/length ratio can not be made too small, since then the spray would quickly reach the walls of the tower and no longer constitute a spray of suspended droplets.

Finally, the tendency for the entrainment of liquid by the exiting gas is considerable, and mist eliminators are almost always necessary at the exit of a conventional spray tower.

SUMMARY OF THE INVENTION

The gas/liquid heat and/or mass exchanger of the present invention limits the nozzle hysteresis and controls the path and rate of descent of the liquid by employing a plurality of thin guide filaments, such as wires or cords, that pass out of the outlet orifice or orifices of a chamber that holds the liquid to be treated, preferably descending in a straight line to the bottom of the exchanger. The chamber is supported on a frame, and the guide filaments are securely attached to the frame, in fixed positions with respect to the frame, at their top and bottom ends. It is preferred that the guide filaments be maintained under longitudinal tension.

The guide filaments descending from the outlet orifice provide a wicking action that draws liquid from the orifice and tends to offset the hysteresis effect described above. As the liquid emerges from the nozzle or orifice it forms a plurality of thin, falling films one of which flows down along each guide filament, or a single film that bridges all the guide filaments and flows down along them as a single sheet of liquid. The downward path of the film or films of liquid thus formed is guided by the filaments.

The dynamic fluid resistance of the guide filaments imposes a terminal velocity on the falling liquid film or fills as the liquid moves downward, all the while maintaining contact with the filaments. The adhesive attraction of the surface of the guide filaments preserves the thin film character of the falling liquid by opposing the cohesive force of the liquid which would, in the absence of the filaments, cause the stream to break up into discrete droplets. Because of the thin film character of the falling liquid, the rate of flow can be made quite small for those applications where a very thin film or long liquid holding time is desirable.

The effectiveness of the exchanger for a given quantity of material of which it is constructed (which is referred to in this specification as the "material efficiency" of the exchanger) is dependent on the volume of the guide filament material required to preserve the falling film character of the stream. Since the stabilizing effect of a guide filament is a direct function of its surface area, and the surface-to-volume ratio of each filament increases as its diameter is decreased, it follows that the material efficiency of the exchanger can be improved by using smaller diameter filaments. A smaller diameter guide filament also increases the effectiveness of the interfacial contact between the liquid and the gas in the exchanger, since for a liquid film of constant thickness flowing down a filament the surface-to-volume ratio of the liquid increases as the inside diameter of the annular-shaped film decreases because of the reduction in the diameter of the filament down which the film of liquid is flowing.

The guide filaments of the heat and/or mass exchanger of this invention may be visualized as a kind of "forest" of discrete nozzles or outlet orifices with wicking filaments descending therefrom. In a preferred embodiment, a horizontally elongated nozzle or outlet orifice is employed, with a plurality of guide filaments descending from that orifice forming an array of parallel guide filaments having their longitudinal axes oriented in a given plane. The plane may be vertically oriented or tilted from the vertical In either event, with the proper liquid flow rate the array of filaments guides a thin, continuous film or sheet of liquid, which extends across the entire array of filaments, down from the outlet orifice to the bottom of the exchanger.

It is further preferred to arrange a plurality of such arrays of guide filaments with each array parallel to and spaced from the arrays that are adjacent to it. With the guide filaments maintained in a straight, taut form under longitudinal tension, each stream of liquid extending across and flowing down a given array of guide filaments will maintain its integrity separate from the similar films that flow down the arrays of filaments on either side of the given array of filaments.

A preferred form of anti-fouling nozzle or outlet orifice is disclosed. The nozzle is also claimed as a subcombination, since it can be used to good effect in many other applications where scaling deposit in a liquid nozzle is a problem.

BRIEF DESCRIPTION OF THE DRAWING

The invention will now be described in more detail, by reference to the accompanying drawing, in which:

FIG. 7A is a perspective view of an element adapted for inclusion in a liquid nozzle or outlet orifice for an array of guide filaments.

FIG. 7B is a fragmentary, cross-sectional view of a number of the elements illustrated in FIG. 7A, with each such element mounted between a pair of adjacent and parallel arrays of guide filaments in an exchanger in accordance with my invention.

FIG. 7C is a fragmentary, cross-sectional view of one of the nozzle arrays shown in FIG. 7B, taken along the line 7C—7C in the latter Figure.

FIG. 8A is an enlarged view of the structure shown in dashed box 8 of FIG. 7B, after a period of use of the exchanger illustrated in the latter Figure without any relative movement between the guide filaments and the elements of the type illustrated in FIG. 7A.

FIG. 8B is a similar view of the structure shown in dashed box 8 in FIG. 7B, after a longer period of use of the exchanger illustrated in the latter Figure, but with relative movement provided between the guide filaments and the elements of the type illustrated in FIG. 7A.

FIG. 8C is a horizontal cross-sectional view of the structure of FIG. 8B, taken along the line 8C—8C in the latter Figure.

DESCRIPTION OF THE PREFERRED EMBODIMENT

Figure 1A:
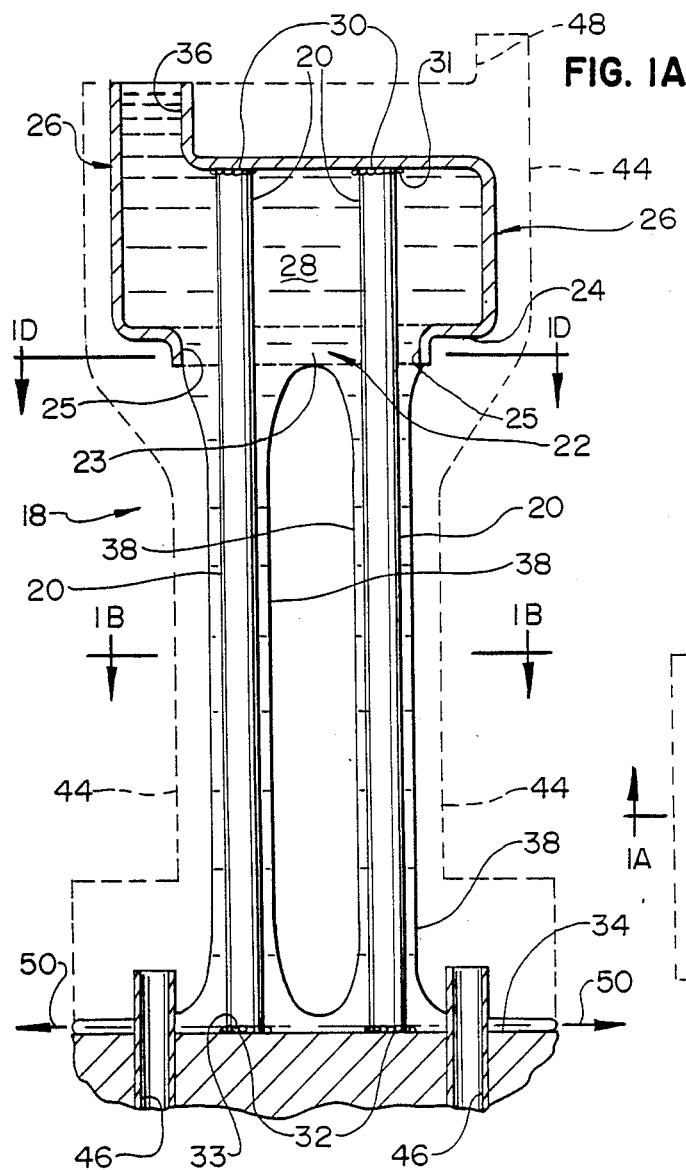
FIG. 1A is a vertical cross-sectional view of one embodiment of the apparatus of the present invention.

FIG. 1A is a vertical cross-sectional view of one embodiment 18 of the gas/liquid heat and/or mass exchanger of this invention, showing the basic construction of this embodiment of the invention. For the sake of clarity, only two flow stabilizing guide filaments 20 are shown, descending from outlet orifice 22 in bottom wall 24 of chamber or manifold 26, which is adapted to hold liquid 28. As will be seen from FIG. 1D below, in this embodiment outlet orifice 22 is formed by side walls 23 and end walls 25, and is subdivided into smaller openings by filaments 20.

Guide filaments 20 may be formed, for example, of any suitable polymeric material such as nylon, or of any suitable metal, or the like.

Liquid flow stabilizing guide filaments or cords 20 are preferably straight in form, being held in longitudinal tension in this embodiment between their top ends 30 and their bottom ends 32. Guide filaments 20 are anchored at their top ends 30 to the inside of the top wall of manifold 26 by adhesive 31 or other suitable means, and at their bottom ends 32 to base 34 of the exchanger by adhesive 33 or other suitable means. Manifold or chamber 26 and base 34 are securely attached by suitable means to a support frame (not shown for this embodiment), which attachments maintain top and bottom ends 30, 32 of the guide filaments in fixed positions with respect to the frame. Guide filaments 20 are thus at least indirectly attached to the support frame at both their top and bottom ends.

In the embodiment illustrated in FIG. 1A, guide filaments 20 are quite widely spaced from each other. If desired, they may be spaced very much closer to each other, and may in fact contact each other (as well as the walls that define outlet orifice 22) if their cross-sectional shape is such that there is still room for liquid 28 to flow through the outlet orifice and downward along the guide filaments. The controlling limitation is that the transverse cross-sectional area of each of guide filaments 20 must be sufficiently small to allow liquid 28 contained in manifold 26 to pass through orifice 22 and flow down along the filaments in the form of a thin film or films.

The spacing between adjacent guide filaments 20 in FIG. 1A is approximately three times the cord diameter. If it is desired to have a more rapid liquid flow rate, this spacing may be increased to as much as five times the cord diameter, or even more.

In operation, liquid 28 enters chamber 26 through liquid inlet 36 and exits from the chamber through outlet orifice 22. Upon leaving the outlet orifice, liquid 28 flows, in the form of a thin, falling film 38, in a straight path down each guide filament 20 to base 34 of the exchanger.

Guide filaments 20 may be either monofilaments or multiple filaments such as a twisted assembly of monofilaments. The flow of a thin, falling film of liquid 38 is more even along monofilaments, and in addition the film is likely to be more stable, than when the flow proceeds along multiple filament cords. On the other hand, the surface area traversed by the falling film of liquid is greater when the guide filament is a multiple filament, and thus the exposed exterior surface of the film is likely to be larger than when a monofilament is used, which makes for greater interfacial contact between the gas and the liquid with which the exchanger is used. This latter advantage must be balanced against the greater tendency to icing, scaling and corrosion that is present when multiple filament cords 20 are used.

Monofilament cords 20 in the embodiments illustrated in the drawing are circular in transverse cross section, which is best for most applications. If desired, other cross-sectional shapes may be employed, such as elliptical or even other shapes.

Figure 1B:
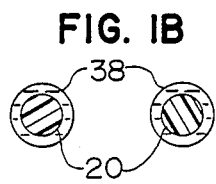
FIG 1B is a fragmentary, horizontal cross-sectional view of the apparatus of FIG. 1A, taken along line 1B—1B in the latter Figure.

For suitably low liquid flow rates, which may be gravity induced or produced by a moderate liquid pressure, the liquid adheres to the individual cords 20. This flow pattern is shown in FIG. 1B, which is a horizontal, cross-sectional view of cords 20 taken along the line 1B—1B in FIG. 1A. At higher flow rates, liquid film 42 tends to bridge the gap between cords 20, as shown in the cross-sectional view of the cords in FIG. 1C.

The ability of the liquid to bridge the gap between cords 20 is largely a function of cord spacing, liquid flow rate, the surface tension of the liquid, and the adhesive attraction of the liquid to the cords. I have found that by using 0.03" monofilament nylon cords when ordinary tap water is the liquid and the flow is gravity induced, a cord pitch (i.e., distance between cord center lines) of 0.15" can readily sustain a stable web or sheet of water extending between the cords.

The gas that flows across thin films 38 or 42 can be introduced into conduit 44 (shown schematically in dashed lines in FIG. 1A) through gas inlets 46. The gas rises through conduit 44 past films 38 or film 42, around chamber or manifold 26, and out gas outlet 48. The liquid, after flowing downward as thin, falling films 38 or as a single thin, falling film or sheet 42, flows outward along base 34 of the exchanger in the directions indicated at 50, 50.

If desired, both the gas and the liquid flowing from exchanger 18 can be gathered, and their flow controlled, by suitable confining means depending upon the purpose for which the exchanger is to be used. One example of an application in which the liquid is guided through pipes or conduits both into and out of the exchanger, but the gas is unconfined, is a power plant cooling tower in which falling streams of water are cooled by evaporative and sensible heat exchange as the water is exposed to ambient air moving freely through the exchanger.

The current art for exchanging heat or mass between liquids and gases that are in direct contact with each other involves a variety of different mechanisms for any of several purposes. For example, a packed tower in which a liquid dribbles down through an enclosed column of loosely packed solid packing material in a direction counter-current to a rising gas is widely used in gas stripping operations because of its superior interfacial surface area, liquid holding time and limited fluid pressure drop.

However, this sort of exchange device is not suitable for supercooling water with sub-freezing air because it is vulnerable to becoming clogged with ice. The current art for supercooling water with air favors devices such as sparged vessels (bubble columns), spray towers or wetted wall towers, in all of which horizontal, solid, ice forming, surfaces are absent.

It is a demonstration of the versatility of my invention that a single device can be optimized to exhibit high efficiency for the two quite different purposes just mentioned.

In the case of gas stripping, the fact that in my invention the thin sheets of falling liquid are defined by cords that are preferably held in a state of tension insures perfect flatness and permits very close spacing of the liquid sheets flowing down the respective arrays of cords. In addition, the straight path that the gas follows through the exchanger lowers the gas pressure drop and improves the balance of the gas flow.

When used as a water supercooler, this same exchanger is much less vulnerable to icing because there are no horizontal solid surfaces upon which seed crystals can anchor themselves. For lower degrees of liquid supercooling, this exchanger is effectively non-icing.

The text book *Mass-Transfer Operations* by Robert E. Treybal 3rd Ed., pages 140, 158–160, 210–211 and 259–262 (McGraw-Hill Book Company, New York, N.Y.) describes a variety of mass transfer devices in addition to those just mentioned, including tray towers, venturi scrubbers, and power plant cooling towers. In most applications a device in accordance with my invention can be substituted to good advantage for any one of these current art mass transfer devices.

Figure 1C:
FIG. 1C is a view similar to FIG. 1B, except that it shows the pattern of liquid distribution in the device of FIG. 1A for a more rapid liquid flow rate than is illustrated in FIGS. 1A and 1B.
Figure 1D:
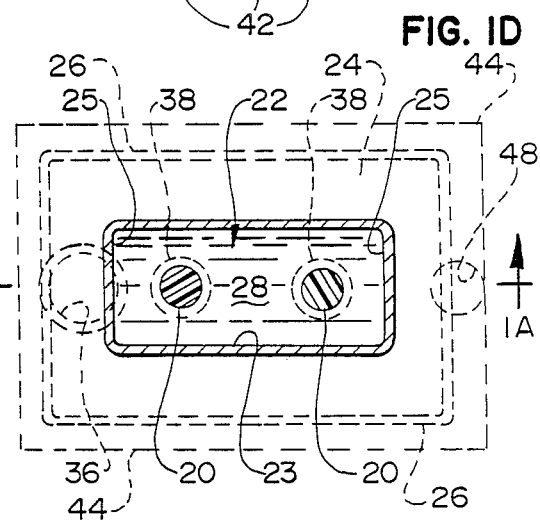
FIG. 1 is a horizontal cross-sectional view of the apparatus of FIG. 1A, taken along the line 1D—1D in the latter Figure.

FIG. 1D is an enlarged, horizontal sectional view, taken along line 1D—1D in FIG. 1A, that shows how liquid 28 enters chamber or manifold 26 through liquid inlet 36, and from there flows down out of outlet orifice 22 in bottom wall 24 of the chamber. As the liquid flows downward under the influence of gravity along the surface of each cord or guide filament 20, it forms a thin, falling film 38 around each of the cords. In the meantime, gas entering at the bottom end of conduit 44 rises past falling liquid films 38, in contact with those films, and exits through gas outlet 48 at the top end of conduit 44.

Figure 2:
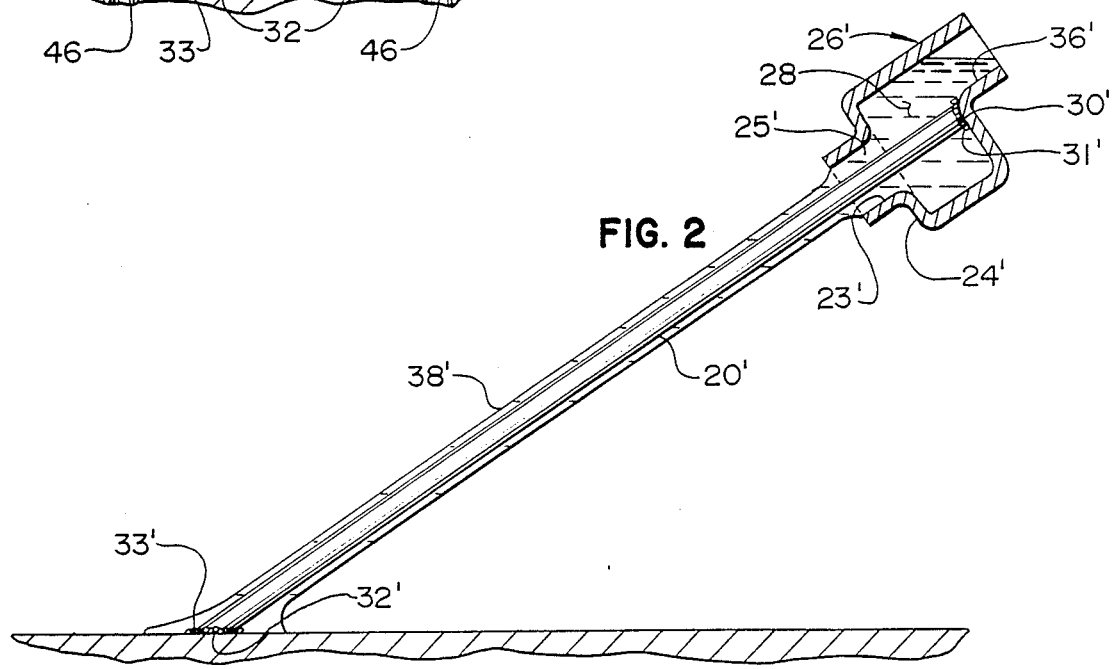
FIG. 2 is a fragmentary, end elevation of a device similar to the embodiment of FIG. 1A, modified by inclining the device from the vertical.

It will be seen that in the embodiment of FIGS. 1A to 1D side walls 23 are spaced from filaments 20. In other embodiments to be described below, the side walls press against the guide filaments and thereby subdivide the outlet orifice into discrete, smaller openings FIG. 2 shows a fragmentary end elevation of a device similar to the device of FIG. 1A except that cord or guide filament 20' is tilted at an angle to the vertical Cord 20' is held in longitudinal tension by being anchored at both its top end 30' and its bottom end 32'.

One advantage to tilting the cord or guide filament is that the liquid film will fall more slowly along the filament. This is desirable where longer liquid holding times are preferred. Another advantage of tilting the liquid flow is that the liquid travels farther in falling from a given height. This results in increased interfacial surface area without increasing the energy requirement for lifting the liquid to the height of liquid inlet 36'.

The angle to the vertical at which guide filament or cord 20' may be tilted to achieve optimum results depends upon many factors. These factors include the adhesion of the liquid to the surface of the guide filament, the cohesion of the liquid, the rate of flow of the liquid, the specific gravity of the liquid, the spacing between adjacent cords or guide filaments, and the smoothness of the surface of the cord or guide filament.

Figure 3:
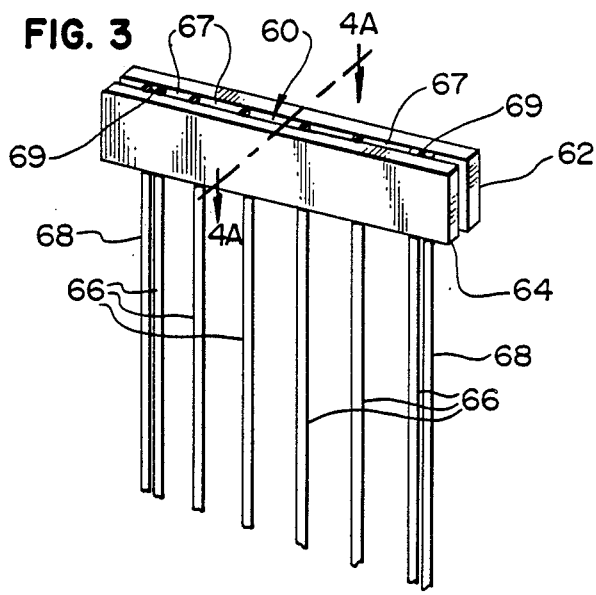
FIG. 3 is a perspective view of an array of parallel guide filaments in which two header members and the guide filaments of the exchanger subdivide the liquid flow distributing nozzle or outlet orifice into a plurality of openings.

FIG. 3 gives a fragmentary, perspective view of outlet orifice 60, which is defined by header members 62 and 64, together with closure members (not shown) at each end of the orifice. An array of guide filaments made up of a plurality of cords, including equally spaced interior cords 66 and more closely spaced exterior cords 68, descends from orifice 60. All the cords are secured at their top ends to header members 62 and 64, and are anchored at their bottom ends (by means not shown) to maintain them in a straight form and under longitudinal tension. Header members 62 and 64 form a part of the bottom wall of a liquid holding chamber or manifold that is fixedly attached to a support frame (in an arrangement of parts that is omitted for clarity in FIG. 3). Cords 66 and 68 are thus at least indirectly attached at their top ends to the support frame, and are likewise at least indirectly attached to the frame at their bottom ends.

As will be seen, outlet orifice 60 is horizontally elongated. All guide filaments 66, 68 descending from outlet orifice 60 have the same diameter, are parallel to each other, and are aligned with their longitudinal axes in a single plane. Elongated outlet orifice 60 has a width substantially equal to the diameter of guide filaments 66 and 68, and a horizontal length that is greater than the product of the diameter of the guide filaments times the number of guide filaments (in this embodiment, eight) descending from the orifice.

Exterior guide filaments 68 are positioned closer to their adjacent interior guide filaments 66 than the guide filaments 66 in the interior of this array of filaments are spaced from each other, in order to counteract (in a manner to be described below) the tendency towards instability in the thin, falling film of liquid that is formed with this embodiment. With the proper operating parameters, the falling film of liquid resulting from use of the array of guide filaments shown in FIG. 3 will have the form of a continuous film of liquid extending between adjacent guide filaments in the same manner as is achieved with the simplified embodiment employing only two guide filaments 20 that is illustrated in FIG. 1C and discussed above. In other words, a thin, falling film or sheet of liquid is formed that extends from exterior guide filament 68 on the left of FIG. 3, past and around all interior guide filaments 66 from left to right in that Figure, and finally to exterior guide filament 68 on the right-hand side of the Figure.

The tendency toward film instability at the outer portions of the array of guide filaments mentioned above results from the fact that the cohesive attraction (surface tension) of the liquid tends to pull the edge of the falling liquid film or sheet inward away from the exterior guide filaments 68 of the array. This problem does not occur with the interior cords or guide filaments 66 because the film of liquid extends laterally away from each interior cord in opposite directions, thus canceling out the cohesive force that would otherwise tend to pull the liquid film away from each interior cord.

As will be seen, the problem of instability of the liquid film at the two outer edges of the array of guide filaments from a given outlet orifice such as opening 60 is met in the embodiment of FIG. 3 by the closer spacing of exterior elements 68 to their respective adjacent interior elements 66. It is believed that this closer spacing produces a greater wicking effect as the liquid film flows downward, which offsets the imbalance caused by the cohesive force of the liquid that is discussed above.

Once the liquid is distributed evenly across guide filaments or cords 66 and 68 shown in FIG. 3, it will fall at a terminal velocity exhibiting good stability. However, care must be taken as to the manner in which the liquid is initially spread across the cords. Otherwise, due to the wide cord spacing, the liquid will not spontaneously spread itself in the proper manner.

Each discrete opening 67 into which outlet orifice 60 is subdivided (as shown in FIG. 3) that lies between each pair of immediately adjacent interior guide filaments 66 helps in initially establishing the falling film or sheet of liquid across all guide filaments 66 and 68. This is because of the elongated, generally rectangular cross-sectional shape of these openings As seen, cords 66 and 68 are sandwiched between two flat header members 62 and 64, to form individual subdivided nozzle openings 67 in the space separating the parallel plane faces of the header members Each of those discrete, subdivided nozzle openings 67 has a horizontal cross-sectional shape approximating a rectangle, with any two adjacent cords 66 forming two opposing walls of the opening and the opposing flat header members 62 and 64 providing the remaining two opposing walls.

Each subdivided nozzle opening 69 between the outermost interior guide filaments 66 and adjacent exterior guide filaments 68 is similarly formed, but with a smaller generally rectangular cross-sectional shape. Nozzle openings 69 also help in initially establishing the falling film or sheet of liquid across all guide filaments 66 and 68.

Any suitable means may be used to attach headers 62 and 64, and their associated guide filaments 66 and 68 in the exchanger of this invention. A preferred method of attaching filaments 66 and 68 to headers 62 and 64, and then installing that assembly of parts in the exchanger, is illustrated in FIGS. 4A through 4D.

Figures 4A, 4B:
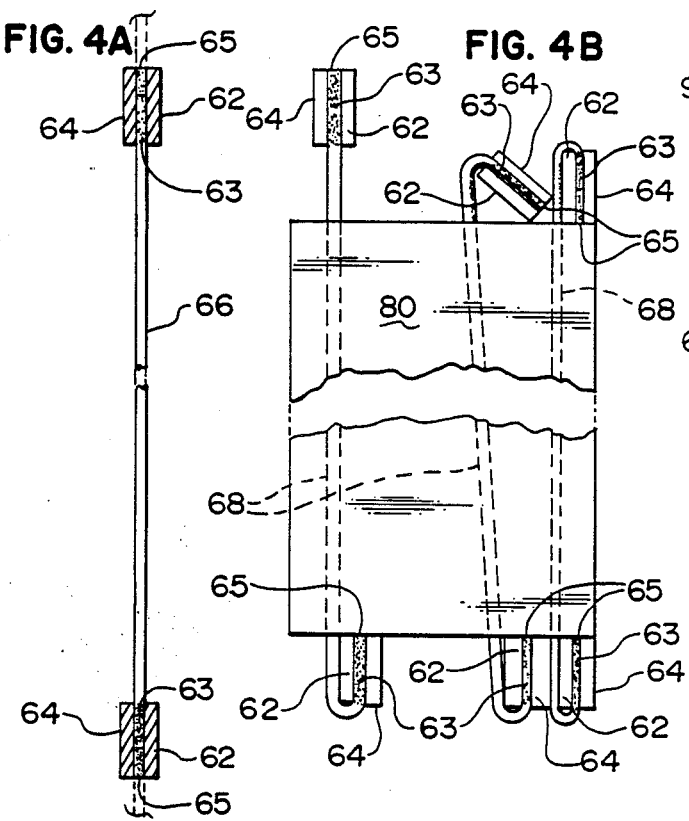
FIG. 4A is an end elevation view of an array of coplanar, parallel, liquid stabilizing guide filaments as the array would appear in one stage of its manufacture.
FIG. 4B is a fragmentary, end elevation view of the array of guide filaments of FIG. 4A after it has been mounted on an exchanger frame, with a second array of similar guide filaments just being moved into place in the exchanger and a third array of similar guide filaments next in line to be moved into place in the exchanger.

FIG. 4A illustrates a simple method for fabricating a liquid flow stabilizing array comprised of downwardly extending guide filaments 66 and 68 such as are shown in FIG. 3. The view shown is a vertical cross-sectional view taken, for example, along line 4A—4A perpendicular to header elements 62 and 64 in FIG. 3.

In manufacture, the array of guide filaments is created by any suitable method such as passing the cord back and forth across a frame that aligns the cord segments parallel to and spaced from each other. Each cord 66 or 68 is then secured to header members 62 and 64 at both the top and the bottom of the array of cords, by gluing them as indicated at 63 in FIG. 4A, with sufficient glue to secure the filaments and in addition form a dense matrix of adhesive that produces a liquid proof seal between the headers. The cords are then trimmed at the outer edges of header members 62 and 64, as at 65, at the top and bottom of the array of cords.

As just mentioned and as indicated in FIG. 4A, when cords 66 and 68 are secured to header members 62 and 64, sufficient adhesive 63 is used not only to produce a reliable attachment of the cords to the header, but also to fill in the spaces between adjacent cords with a dense adhesive matrix that provides a liquid proof seal. This will avoid unwanted openings when the arrays of guide filaments are installed in the exchanger in the manner now to be described in connection with FIGS. 4B through 4D.

FIG. 4B, which is a fragmentary, end elevation of a series of arrays of guide filaments 66 and 68 being installed in the exchanger of this invention, shows one manner in which the array of guide filaments fabricated as shown in FIG. 4A can be mounted in a working exchanger. Guide filament 68 on the right-hand side of FIG. 4B has already been mounted and put under tension in the exchanger. Both this cord 68 and the next cords 68 to the left (which are in the process of being introduced into the exchanger and thereafter mounted so as to be under tension) are largely obscured from view by near end support wall 80, which is fixedly attached to the support wall of the exchanger.

These guide filaments or cords are being installed in an exchanger in which each array (seen in end elevation in FIG. 4B) of vertical guide filaments will have its cords located in the same plane, and each of the various arrays thus formed will be parallel to and spaced from every other similar array of guide filaments in the exchanger. After the step in the assembly process that is under way on the right-hand side of FIG. 4B is completed, one or more additional arrays of guide filaments, each comprising a plurality of cords located in a given plane, will be mounted in the exchanger of FIG. 4B in the center and left-hand portions of the Figure, extending in that Figure back into the paper in a direction normal to the paper.

As seen in FIG. 4B, header members 62 and 64 at the bottom end of the second cord 68 from the right-hand side of this Figure have been rotated 180° in the counterclockwise direction, and then positioned so that header member 64, resting on end support wall 80, presses securely against near cord 68 (as well as against the parallel cords 66 and far cord 68 that are located behind near cord 68) on the extreme right-hand side of the Figure. Header members 62 and 64 at the top of the Figure that are associated with the second array of guide filaments are being rotated 180° in the clockwise direction, with near guide filament or cord 68 (and the parallel cords that are located behind near cord 68) glued between them. When completed, this action of rotating header members 62 and 64 at the top of cord 68 will anchor that cord (and the cords behind it) in place, and ensure that the individual cords of these arrays of cords are straight and taut, in the preferred state of longitudinal tension.

(It will be understood that suitable means is provided for positioning end support wall 80, and its counterpart at the far end of the arrays of guide filaments 66 and 68, during the time that the guide filaments are being mounted under tension in the manner described, by fixedly attaching wall 80 to the basic support frame of the exchanger. It will also be understood that the side of this assembly of parts on the left in FIG. 4B must be left open, in order to provide room to maneuver successive pairs of headers 62, 64, until the assembly process is completed. After the assembly is completed, suitable means for introducing liquid and gas into the exchanger, and for guiding liquid and gas out of the exchanger, are put in place.)

The tension in the cords produced as just described serves several important purposes With inadequate tension, there is a tendency for the liquid flow in the vertical midportion of an array of guide filaments to break up into several separate streams. This is so because the cohesive force of the liquid tends to cause the cords in each stream of liquid to be drawn together, and if two adjacent cords are drawn together in this way an unbridgeable space may be produced between the stream flowing down one of those cords and the stream flowing down the next adjacent cord on the other side. With greater tension in the cords, they resist being drawn together, which helps ensure the stable flow of a single uniform film or sheet of falling liquid spread across the entire array of downwardly descending guide filaments.

The plurality of arrays of straight, taut, parallel, downwardly descending guide filaments—with the longitudinal axes of the guide filaments in each array located in the same plane, and each array parallel to and spaced from all the other arrays—that is discussed above in connection with FIG. 4B will make for the most efficient and effective utilization of the available space in which to locate the gas/liquid heat and/or mass exchanger of this invention. This type of construction makes possible extremely dense, high performance exchangers in which the thin, falling liquid films or sheets do not warp under extremes of temperature cycling.

With parallel arrays of guide filaments, it is important to preserve the flatness of each film or sheet of liquid flowing down a given array of filaments, and to preserve the precise spacing between such parallel, falling films of liquid—or, in other words, to prevent what may be called "warping" of the streams of liquid. The problem with warping is that if closely spaced films of falling liquid warp out of their respective planes even a little bit they will touch each other, which results in the formation of highly destructive liquid bridges between the liquid films. The liquid bridges introduce instability into the streams of liquid, which can propagate in unpredictable ways and destroy the uniformity of the falling films of liquid.

Figure 4C:
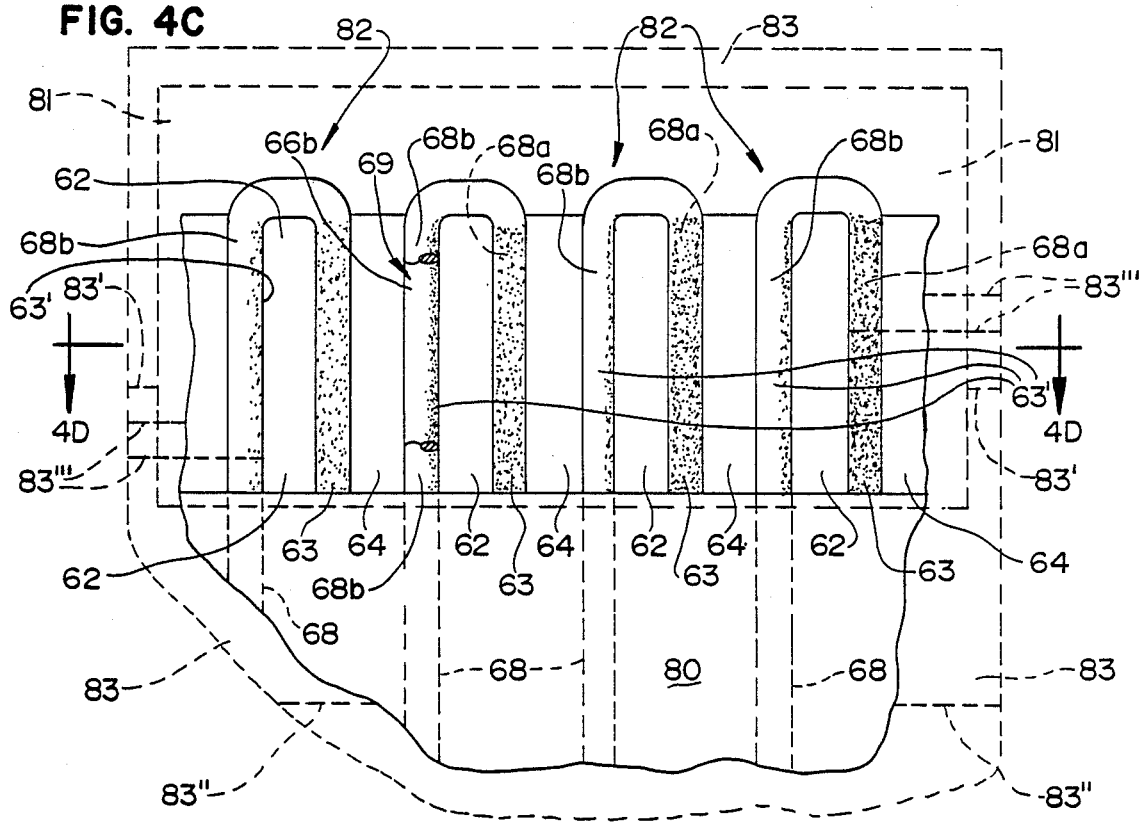
FIG. 4C is a fragmentary, end elevation of one embodiment of the exchanger of this invention that includes a plurality of spaced, parallel arrays of guide filaments, each of which arrays includes a plurality of coplanar, straight, taut, parallel guide filaments spaced one from the other.
Figure 4D:
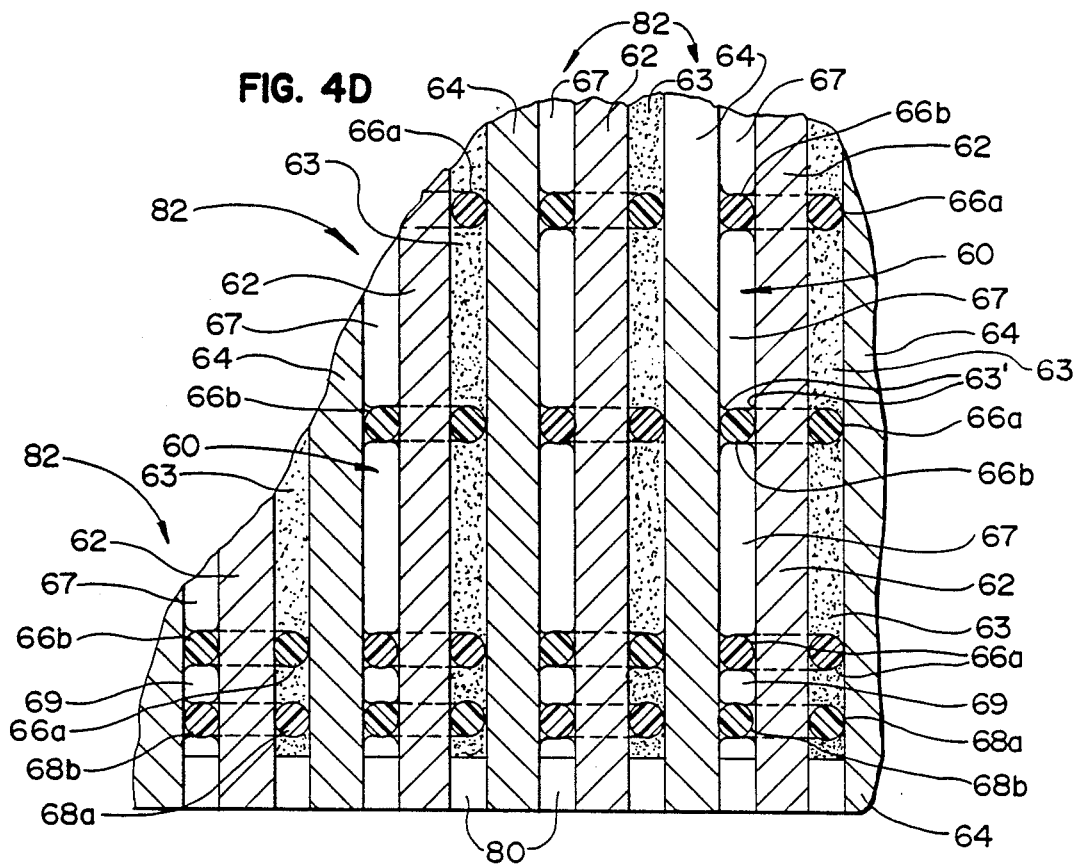
FIG. 4D is a fragmentary, sectional view of the embodiment of FIG. 4C, taken along the line 4D—4D in the latter Figure.

An example of the type of desired construction just referred to that will produce flat, parallel, unwarped, falling sheets of liquid is illustrated in FIGS. 4C and 4D. FIG. 4C is an enlarged, fragmentary, end elevation of a plurality of arrays 82 of straight, taut guide filaments. In each of these arrays the filaments are coplanar and parallel to each other. FIG. 4D is a fragmentary, sectional view of the arrangement of parts shown in FIG. 4C, taken along the line 4D—4D in the latter Figure.

In FIG. 4C, the method of mounting a plurality of arrays of guide filaments that is illustrated in FIG. 4B has been carried out to position at least four such arrays 82. As seen in FIG. 4D, each array is made up of at least three interior guide filaments 66 equally spaced from each other, with one exterior guide filament 68 at each end of the array. Because FIG. 4C is an end elevation, interior guide filaments 66 are largely obscured by the exterior guide filament 68 on the rear side of this view, and can be seen (beyond space 69 behind filament 68) only where one of the near exterior guide filaments 68 is broken away. Of course, the central portions of even the exterior guide filaments 68 are obscured by end support wall 80.

In FIG. 4D, arrays 82 of coplanar, parallel guide filaments 66 and 68 descend from outlet orifices 60, each of which is comprised of a plurality of discrete, subdivided openings 67. Each such opening 67 is defined by header members 62 and 64 and a pair of immediately adjacent guide filaments 66. As will be seen, extreme upper end portions 66a of each interior guide filament 66, as well as extreme upper end portions 68a of each exterior guide filament 68, have been bent over as shown in FIG. 4C. The extreme upper end portions 66a and 68a of a given array of guide filaments are tightly confined by the header members 62 and 64 that are associated with that given array, and are further secured to those header members by a dense adhesive matrix 63 (which in addition fills up unwanted openings with a liquid proof seal, as discussed above in connection with FIG. 4A). The upper ends 66b and 68b of the main portions of each guide filament 66 and 68 are similarly tightly confined between header member 62 associated with those filaments and header member 64 associated with the next adjacent array of guide filaments located to the left in FIG. 4D.

As indicated, a minimal amount of adhesive 63' may be used, if desired, to position the upper ends of the main portions 66b and 68b of the guide filaments more securely between header members 62 and 64 as just described. As already mentioned above, an excess of adhesive 63 is used to close up the openings that would otherwise exist between adjacent extreme upper end portions 66a and 68a of the guide filaments and would permit unwanted liquid flow out of the chamber at the top of the exchanger.

Chamber or manifold 81 is shown schematically in FIG. 4C. Basic support frame 83 is likewise shown schematically. Chamber 81, end wall 80, and header members 62 and 64 are all fixedly attached by suitable means (shown schematically as members 83', 83" and 83''', respectively) to support frame 83. As will be seen from FIGS. 4C and 4D, header members 62 and 64, dense adhesive matrix 63, extreme upper end portions 66a and 68a of guide filaments 66 and 68, and certain parts of the top edge of wall 80 in effect constitute the bottom wall of chamber 81, by which outlet orifices 60 and their discrete, subdivided openings 67 and 69 are defined.

Figure 5:
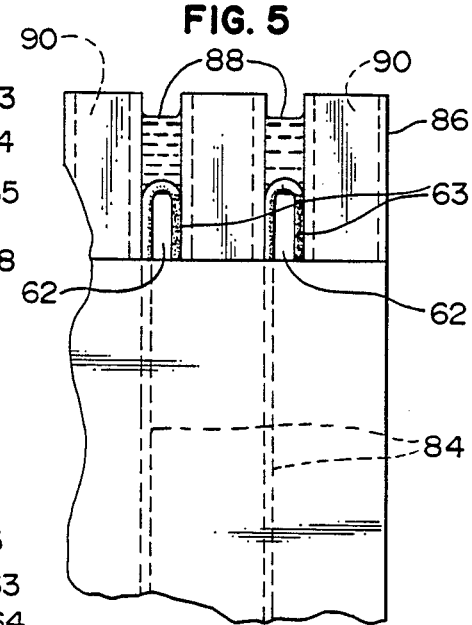
FIG. 5 is a fragmentary, end elevation of an alternative structure for a plurality of arrays of guide filaments, which structure is adapted for countercurrent gas/liquid flow.

FIG. 5 is a fragmentary, vertical cross-sectional view taken through two arrays of guide filaments 84 that shows a construction adapted for countercurrent heat or mass exchange. To accomplish countercurrent flow, it is necessary to provide a path by which the gas can enter the exchanger at its base and pass up through the exchanger between the cord stabilized liquid films or sheets extending across the arrays of cords, and exit at the top. In this arrangement of parts, header member 64 of the embodiment of FIGS. 4A through 4D has been replaced by an elongated hollow member 86 formed of sheet material. The polycarbonate structured sheet manufactured by Polygal Corporation, 2352 Highway 14 West, Janesville, Wis. 53547, is an example of this sort of material. The manifold that channels liquid 88 to the arrays of cords 84 is formed in the space between the faces of hollow members 86.

The header member construction shown in FIG. 5 is used with a similar header member construction at the bottom of the exchanger, so that gas can enter through open ducts (not seen) similar to open ducts 90 at the top of FIG. 5, all of which ducts are formed by hollow members 86. The gas then passes up through the exchanger in the spaces between adjacent arrays of guide filaments 84, and exits at the top through ducts 90.

Figure 6:
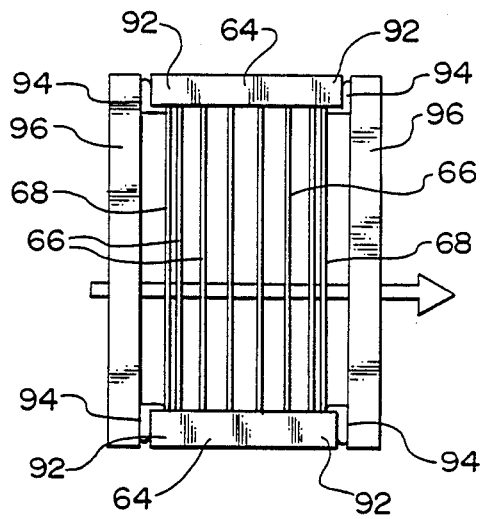
FIG. 6 is a side elevation view of an array of guide filaments, which structure is arranged for crosscurrent gas flow.

FIG. 6 illustrates a frame for an array of guide filaments 66, 68 similar to the array of FIG. 3. Top and bottom header members 62 on the far side of FIG. 6 are of course obscured by top and bottom header members 64 on the near side of this Figure.

Outer end portions 92 of header members 62 and 64 are supported by angle irons 94 fastened to vertical support pipes 96. Using angle irons in combination with pipes has the advantage of leaving an essentially unobstructed gas path into and out of the array of liquid stabilizing cords or guide filaments. The path of the air or other gas through the exchanger is indicated in this Figure by arrow 98.

A preferred type of nozzle or outlet orifice is shown in FIGS. 7A through 7C. FIG. 7A shows an elongated rectangular member 100 of stiff, springy flat material that has been folded in the middle along its longitudinal axis 101 to produce a cross-section substantially in the shape of an inverted "V." (The shape referred to is intended to include an inverted rounded "V" shape such as is illustrated in the drawing.) FIG. 7B is a fragmentary, end elevation of several cord arrays 102 (oriented as in FIG. 4C), with a folded member 100 inserted between adjacent parallel arrays of guide filaments. The material of which folded member 100 is formed is chosen to exhibit resilient properties so that it will hold its form after being wedged in place. As will be seen, member 100 is stiff in the longitudinal direction, and is springy and resilient in the transverse direction.

Free space is left, as is seen in FIG. 8C, between each pair of immediately adjacent guide filaments. As seen in FIGS. 7B, 8A and 8B, the portions of folded members 100 that press against each of the guide filaments are substantially parallel to the longitudinal axis of the filament.

FIG. 7C is a fragmentary, sectional view of the arrangement of parts shown in FIG. 7B, taken along the line 7C—7C in the latter Figure. As seen in FIG. 7C, the long dimension of folded member 100 is greater than the width of cord array 102 (comprised of interior guide filaments 108 and exterior guide filaments 110). Thus the ends of each member 100 disposed on opposite sides of a given array 102 of guide filaments extend beyond the vertical side edges of that array.

In FIG. 7C, the portions of all the folded members 100 that extend beyond the ends of the vertical edges of the array of guide filaments with which they are associated are embedded in a casting material 104 (such as epoxy resin), which in turn is encased in a "U"-shaped structural member 106, which is slidably supported by member 112. Reciprocating drive means (shown schematically) is provided to move the folded, resilient members 100 back and forth continuously in a direction perpendicular to the longitudinal axes of the guide filaments (in the plane of the paper in FIG. 7C, as indicated at 114 in that Figure).

The nozzle array of FIG. 7A through 7C possesses a number of useful properties One advantage is that a low cost nozzle array can be fabricated from a great variety of materials that exhibit good corrosion resistance and anti-scaling properties, such as, for example, stainless steel or one of the tetrafluoroethylene fluorocarbon polymers sold under the trademark TEFLON by E. I. DuPont de Nemours & Co.

Another advantage is that, if desired, an array of cords that is very long can have several nozzle arrays spaced at various distances down the array. Such an arrangement has value in (1) stabilizing long arrays of cords, or (2) isolating sections of a single cross-flow exchanger so that the separate sections can be operated independently of each other in order to treat a liquid sequentially in a series of separate stages.

Probably the most important advantage of the nozzle array shown in FIGS. 7A through 7C is that it is possible, as explained above, to slide the array back and forth in the horizontal direction. This has the beneficial effect of maintaining each discrete, subdivided opening of each liquid nozzle or outlet orifice clear and unobstructed, through the cooperative interaction of the cords or guide filaments 108 and 110 with the resilient, folded members 100.

This cooperative interaction is illustrated in FIGS. 8A through 8C. FIGS. 8A and 8B provide enlarged views of the area defined by the dashed box 8 in FIG. 7B. As will be seen, box 8 shows a portion of an interior guide filament 108, which is visible because a short length of exterior guide filament 110 (which would otherwise obscure filament 108) is broken away in FIG. 7B.

Scale 116 unavoidably deposits on the surface of folded members 100, tending to build up around each guide filament 108 and 110, between adjacent guide filaments. As a result of this scale build-up, each guide filament 108 and 110 will become progressively further embedded in the scale deposited on folded members 100 that continues to be built up around the filaments. As shown in FIG. 8A, if there is no relative movement in the horizontal direction between cord 108 and its associated folded members 100, the build-up of scale will continue, will at least partially choke the nozzle to create a growing back pressure, and will ultimately cause the failure of the exchanger.

With the continuous back-and-forth horizontal movement 114 described above, it is not possible for cords 08 and 110 to become embedded in the scaling matter 116. Rather, as shown in FIGS. 8B and 8C, cords 108 and 110 ride back and forth over the surface of the deposited scale. Deposited material 116 continues to build up in over-all thickness, but the constant rubbing movement of cords 108 and 110 maintains the width of each elongated nozzle opening 118 (seen in FIG. 8C) at a constant value along the opening.

To accommodate the increased thickness of scale 116, resilient folded members 100 move away from guide filaments 108 and 110, although they continue to press against the filaments through scaling material 116. In effect, space to be occupied by the growing body of deposited scaling matter 116 is provided through the deflection of longitudinally stiff and transversely springy and resilient folded members 100 away from cords 108 and 110 and into the space between adjacent cord arrays 102. This action preserves the clearances within each nozzle or outlet orifice 118 even when there is considerable scale build—up, thereby permitting the unimpaired performance of the exchanger long after scale build-up would disable a stationary nozzle array.

The self-cleaning and clearing property of a moving nozzle array opens the door to the design of high performance exchangers having extremely small diameter guide filaments. For example, if the nozzle dimensions are such that a stationary nozzle array would experience significant foulinq in less than a week, it is believed that moving the array slowly back and forth at a rate significantly less than once a week, say, once an hour, should keep the nozzles or outlet orifices open in the manner explained above.

As is seen from FIG. 8C, the distance the array needs to be moved is a function of the cord pitch; any amount greater than the cord pitch is satisfactory. Thus, with the fine diameter cords contemplated for use in the exchanger of this invention, a movement of only a few millimeters is effective to produce the cleaning and clearing action described.

it is preferred that the relative movement between guide filaments 108 and 110 on the one hand and folded resilient members 100 on the other be effected, as just described, by moving resilient folded members 100 back and forth while holding guide filaments 108 and 110 stationary. However, if desired, the relative movement can be carried out by holding resilient members 100 statioary and moving the arrays of guide filaments with respect to those resilient members. In either event, care should be taken to minimize, and preferably to avoid altogether, vibration of the filaments.

It is believed that the relative movement is most effective if substantially continuous, even at a slow rate. However, if desired, the movement can be intermittent, so long as the guide filaments and folded resilient members do not remain stationary with respect to each other for too long a period at on one time.

The nozzle or outlet orifice just des ribed is a feature included inthe best mode presently contemplated for carrying out this invention of gas/liquid heat and/or mass exchanger. The anti-fouling nozzle just described can also be used to good effect in many other applications, and thus the nozzle is separately claimed below as a subcombination. It should denoted that when such a nozzle is sued in an application other than a heat and/or mass exchanger, the guide filaments within the outlet orifice of the liquid chamber may not extend as far, or be oriented in the same way, as the guide filaments inthe exchanger disclosed in this specification and the accompanying drawing. In some such cases the liquid exiting the liquid chamber through the outlet orifice may flow along the guide filaments for only a short distance before following another path.

Because of its material efficiency, effectiveness and ease of manufacture, the embodiment of this invention described above with reference to FIGS. 3 through 4D and 7 through 8C is the best mode presently contemplated for carrying out this invention.

Figure 9:
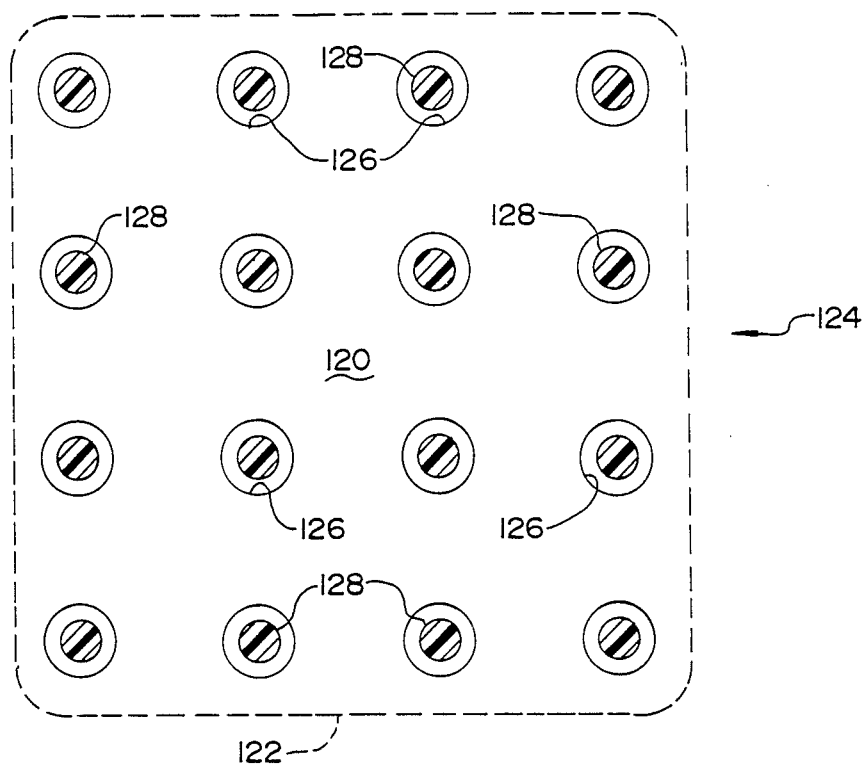
FIG. 9 is a sectional view of another embodiment of the exchanger of this invention, taken along a plane parallel to and slightly above the bottom wall of the liquid-holding chamber.

FIG. 9 is a sectional view of another embodiment of the exchanger of this invention, which is taken along a plane parallel to and slightly above bottom wall 120 of chamber 122 (shown in dashed lines) in which liquid that is to pass through exchanger 124 is contained. Bottom wall 120 defines a plurality of outlet orifices 126. A plurality of guide filaments 128 formed of any suitable material descends from chamber 122 down through the outlet orifices. In this embodiment, only one guide filament extends through each orifice. The transverse cross-sectional area of each guide filament 128 is sufficiently small to allow a liquid contained in chamber 122 to pass through the orifice associated with the filament.

The liquid flows down along filaments 128 in the form of a thin film surrounding each filament. These thin, falling films of liquid come into direct contact with gas that passes adjacent the filaments, and a direct exchange of heat and/or mass takes place between the gas and the falling liquid. If desired, means is provided for positively channeling the gas into and through the spaces below bottom wall 120 through which the falling liquid is guided by filaments 128.

A heat and/or mass exchanger structured as illustrated in FIG. 9 achieves a high level of material efficiency. However, such an exchanger is more difficult to manufacture than the preferred embodiments that have been described above. Because of the complicated problems of manufacture, this embodiment is more expensive to fabricate than the preferred embodiments already discussed.

Figure 10:
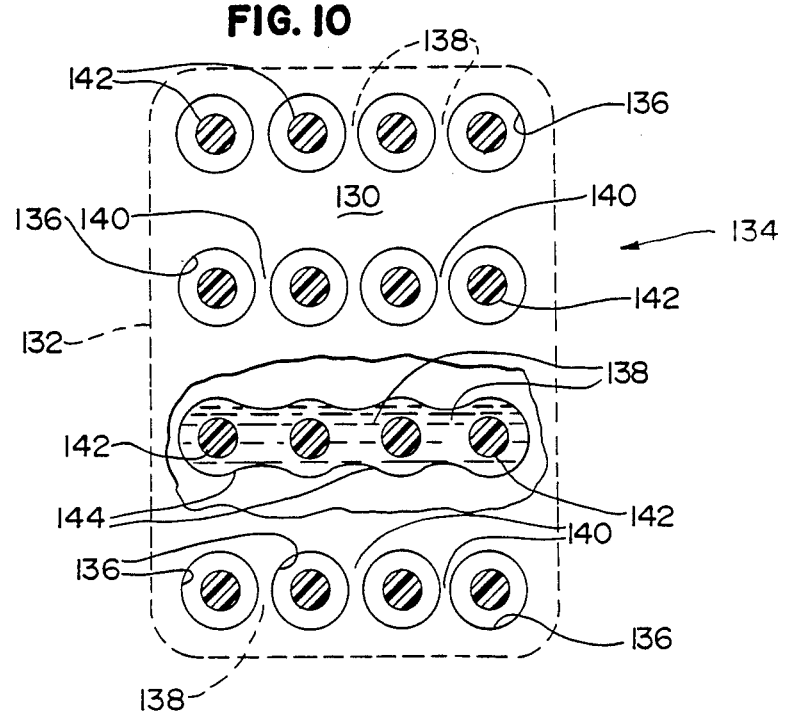
FIG. 10 is a similar view of another embodiment of the exchanger of this invention, partially broken away to show a sectional view taken along a plane located just below the bottom wall of the liquid-holding chamber.

Another embodiment of the exchanger of the present invention is illustrated in FIG. 10. Here, again, the view shown is a sectional view taken along a plane parallel to and slightly above bottom wall 130 of chamber 132 (shown in dashed lines) of exchanger 134. In this embodiment, outlet orifices 136 are defined by bottom wall 130, and are spaced sufficiently close to each other that the falling liquid can bridge across spaces 138 located below land areas 140 between closely adjacent orifices 136 lying immediately next to each other. As a result, a single sheet of falling liquid is formed that extends across and around both guide filaments 142 that are associated with each pair of closely adjacent outlet orifices 136.

Liquid sheet or film 144 produced in the manner described is illustrated in sectional view taken along a plane located just below bottom wall 130 of chamber 132. As is seen, the falling thin sheet or film of liquid 144 bridges the gaps between each pair of closely adjacent guide filaments 142, and fills each space 138 that lies between a pair of closely adjacent outlet orifices 136 in bottom wall 130.

While the present invention has been described, and illustrated in FIGS. 3-4D and 7-8C of the accompanying drawing, in connection with the best mode presently contemplated by the inventor for carrying out his invention, the preferred embodiments described and shown are for purposes of illustration only, and are not to be construed as constituting any limitation of the invention. Modifications will be obvious to those skilled in the art, and all modifications that do not depart from the spirit of the invention are intended to be included within the scope of the appended claims.

I claim:

1. A gas/liquid heat and/or mass exchanger which comprises:
    (a) a chamber adapted to hold a liquid, said chamber having a bottom wall that defines at least one outlet orifice;
    (b) a frame for supporting said chamber; and
    (c) a plurality of thin guide filaments descending from said at least one outlet orifice, the transverse cross-sectional area of each of said guide filaments being sufficiently small to allow a liquid contained in said chamber to pass through said at least one orifice and flow down along said filaments in the form of at least one thin film,
    each of said at least one outlet orifice being horizontally elongated, with a plurality of guide filaments descending from each of said orifices to form an array of filaments associated therewith,
    each of said guide filaments being at least indirectly attached at its top and bottom ends to said frame in positions fixed wiht respect to the frame, with said filaments being surrounded by spaced through which a gas can pass adjacent the filaments, all the guide filaments in the array of guide filaments descending from a given outlet orifice having the same diameter, being parallel to each other, being aligned with their longitudinal axes in a single plane and being spaced from the adjacent guide filaments in the array,
    each of said elongated orifices having a width substantially equal to the diameter of the guide filaments descending therefrom and a length path is substantially equal to or greater than the product of the diameter of the guide filaments times the number of guide filaments descending from said elongated orifice,
    each of said at least one horizontally elongated outlet orifice being defined on two of its opposite sides by longitudinally stiff, transversely springy and resilient members and each of said two stiff, resilient members pressing against the guide filaments descending from said outlet orifice while leaving free space between each pair of immediately adjacent guide filaments,
    whereby said at least on thin, falling film of liquid is in direct contact wiht said gas as the gas passes by said filaments, and a direct exchange of that and/or mass takes place between the gas and the falling liquid.

2. The exchanger of claim 1 in which the portions of said two longitudinally stiff and transversely springy and resilient members that press against each of the guide filaments are substantially parallel to the longitudinal axis of the filament.

3. The exchanger of claim 1 in which one of said longitudinally stiff, transversely springs and resilient members is one leg of a first elongated, rectangular member folded in the middle along its longitudinal axis to form a cross-section substantially in the form of an inverted "V," and the other of said stiff, springy, resilient members is one leg of a second elongated, rectangular member folded in the middle along its longitudinal axis to form a cross-section substantially inthe form of an inverted "V."

4. The exchanger of claim 3 which includes means for providing relative movement between said guide filaments and said longitudinally stiff, transversely springy and resilient members that press against them from opposite sides of the filaments.

5. The exchanger of claim 4 in which said guide filaments are stationary and said longitudinally stiff, transversely springy and resilient members are adapted to move back and forth with respect to said filaments, in directions that are perpendicular to the longitudinal axes of the filaments.

6. The exchanger of claim 5 in which said back and forth movement is substantially continuous.

7. A nozzle for controlling the flow of a liquid, which comprises:
    (a) a chamber adapted to hold the liquid, said chamber having a wall that defines at least one elongate outlet orifice;
    (b) a plurality of parallel guide filaments extending outward from within said at least one outlet orifice, the transverse cross-sectional area of each of said guide filaments being sufficiently small to allow a liquid contained in said chamber to pass through said at least one orifice and flow for at least a short distance along said filaments inthe form of at least one thin film;

(c) a pair of longitudinally stiff, transversely springy and resilient members each of which presses against said guide filaments from an opposite side thereof; and (d) means for providing relative movement in direction perpendicular o the longitudinal axes of said filaments between said guide filaments and said longitudinally stiff, transversely springy and resilient members that press against the filaments from opposite sides thereof.

8. The nozzle of claim 7 in which the portions of said two longitudinally stiff and transversely springy and resilient members that press against each of the guide filaments are substantially parallel to the longitudinal axis of the filament.

9. The nozzle of claim 7 in which said guide filaments are stationary and said longitudinally stiff transversely springy and resilient members are adapted to move back and forth with respect to said filaments, in directions perpendicular to the longitudinal axes of said filaments.

10. The nozzle of claim 9 in which said back and forth movement is substantially continuous.

11. A gas/liquid heat and/or mass exchanger which comprises:
(a) a chamber adapted to hold a liquid, said chamber having a bottom wall that defines at least one outlet orifice;
(b) a frame for supporting said chamber; and
(c) a plurality of thin guide filaments descending from said at least one outlet orifice, the transverse cross-sectional area of each of said guide filaments being sufficiently small to allow a liquid contained in said chamber to pass through said at least one orifice and flow down along said filaments in the form of at least one thin film,
each of said at least one outlet orifice being horizontally elongated, with a plurality of guide filaments descending from each of said orifices to form an array of filaments associated therewith,
each of said guide filaments being at least indirectly attached at its top and bottom ends to said frame in positions fixed wiht respect o the frame, with said filaments being surrounded by spaced through which a gas can pass adjacent the filaments, all the guide filaments in the array of guide filaments descending from a given outlet orifice having the same diameter, being parallel to each other, being aligned wiht their longitudinal axes in a single plane and being space form the adjacent guide filaments in the array,
each of said elongate orifices having a width substantially equal to the diameter of the guide filaments descending therefrom and a length that is substantially equal to or greater than the product of the diameter of the guide filaments times the number of guide filaments descending from said elongated orifice,
each of the guide filaments located in the interior of each of said arrays of filaments being spaced at the same distance for the other filaments in said interior, and the last guide filament at each end of said elongate orifice being spaced at a shorter distance from the guide filament adjacent to it in the interior of said array of filaments, whereby said at least one thin, falling film of liquid is in direct contact with said gas as the gas passes by said filaments, and a direct exchange of that and/or mass takes place between the gas and the falling liquid.

12. A gas/liquid heat and/or mass exchanger which comprises:
(a) a chamber adapted to hold a liquid, said chamber having a bottom wall that defines a plurality of horizontally elongated outlet orifices oriented parallel to each other;
(b) a frame for supporting said chamber;
(c) a plurality of substantially straight, thin guide filaments descending in a n array from each of said outlet orifices,
the transverse cross-sectional area of each of said guide filaments being sufficiently small to allow a liquid contained in said chamber to pass through the outlet orifice with which the guide filament is associated and flow down along said filaments in the form of at least one thin film, said guide filaments being under longitudinal tension, with both their top and bottom ends at least indirectly anchored to said frame, in fixed positions with respect to the frame, to maintain said tension,
said filaments being surrounded by spaced through which a gas can pass adjacent the filaments,
each of the guide filaments inthe array of guide filaments descending from a given outlet orifice having the same diameter and being parallel to and spaced from each other and aligned with their longitudinal axes in a single plane, each of said elongate orifices having a width substantially equal to the diameter of the guide filaments descending therefrom and a length that is substantially equal to or greater than the product of the diameter of the guide filaments times the number of guide filaments descending from said elongated orifice,
all said arrays of guide filaments being parallel to each other,
each of said horizontally elongated outlet orifices being defined on two of its opposite sides by a longitudinally stiff, transversely springy and resilient member, each of said two members pressing against the guide filaments descending from said outlet orifice,
one of said stiff, springy, resilient members being one leg of a first elongated, rectangular member folded in the middle along its longitudinal axis to form a cross-section substantially in the form of an inverted "V," and the other of said stiff, springy, resilient member being one leg of a second elongated, rectangular member folded in the middle along its longitudinal axis to form a cross-section substantially in the form of an inverted "V," and
(d) means for effecting relative movement between said guide filaments and their associated stiff, springy, resilient members that press against them from opposite sides thereof, said guide filaments being stationary and said stiff, springy, resilient members being substantially continuously movable back and forth with respect to said filaments, in directions perpendicular to the longitudinal axes of said filaments,
whereby said at least one thin, falling film of liquid is guided downward by each of said parallel arrays of guide filaments, with the liquid in said at least one film in direct contact with a gas adjacent said film for the purpose of directly exchanging heat and/or mass between the gas and the falling liquid.

* * * * *